United States Patent
Löfgren

(10) Patent No.: US 9,797,300 B2
(45) Date of Patent: Oct. 24, 2017

(54) SUPERCHARGING SYSTEM AND METHOD FOR OPERATING A SUPERCHARGING SYSTEM

(71) Applicant: KASI TECHNOLOGIES AB, Smedjebacken (SE)

(72) Inventor: Isak Löfgren, Smedjebacken (SE)

(73) Assignee: KASI TECHNOLOGIES AB, Smedjebacken (SE)

( * ) Notice: Subject to any disclaimer, the term of this patent is extended or adjusted under 35 U.S.C. 154(b) by 52 days.

(21) Appl. No.: 14/779,663

(22) PCT Filed: Mar. 20, 2014

(86) PCT No.: PCT/SE2014/050339
§ 371 (c)(1),
(2) Date: Sep. 24, 2015

(87) PCT Pub. No.: WO2014/158077
PCT Pub. Date: Oct. 2, 2014

(65) Prior Publication Data
US 2016/0047298 A1    Feb. 18, 2016

(30) Foreign Application Priority Data
Mar. 26, 2013 (SE) ...................... 1350383

(51) Int. Cl.
*F01N 3/22* (2006.01)
*F02B 37/14* (2006.01)
(Continued)

(52) U.S. Cl.
CPC ................ *F02B 37/14* (2013.01); *F01N 3/20* (2013.01); *F01N 3/2006* (2013.01);
(Continued)

(58) Field of Classification Search
CPC ............. F01N 2560/02; F01N 2560/06; F01N 2560/07; F01N 2560/08; F01N 2900/1402;
(Continued)

(56) References Cited

U.S. PATENT DOCUMENTS 6,568,173 B1    5/2003   Kolmanovsky et al.
6,651,432 B1 *  11/2003  Gray, Jr. ................ F01N 3/035
                                                          123/305

(Continued)

FOREIGN PATENT DOCUMENTS

DE    10349164 A1    5/2004
EP    2261479 A1    12/2010
(Continued)

OTHER PUBLICATIONS

Extended European Search Report dated Oct. 20, 2016.
(Continued)

*Primary Examiner* — Jorge Leon, Jr.
(74) *Attorney, Agent, or Firm* — Harness, Dickey & Pierce, P.L.C.

(57) ABSTRACT

A supercharging system includes a charging device having a turbine and a compressor, the compressor having a high speed shaft; a planetary gear set coupled to the high speed shaft and an electric motor, or generator, via a low speed drive shaft; a clutch unit; a power transmission for connecting a crank shaft of the combustion engine to the drive shaft via the clutch unit; at least one sensor to measure at least one physical parameter of the exhaust gases inside, or after having passed, an exhaust gas catalyzer of the internal combustion engine, the at least one sensor being configured to provide an output signal representing a measured value of the at least one physical parameter; and a system control unit to receive the output signal and to control the speed or effect
(Continued)

of the electric motor, or generator, based on the output signal. A method is also disclosed.

17 Claims, 4 Drawing Sheets

(51) Int. Cl.
| | |
|---|---|
| *F02B 37/10* | (2006.01) |
| *F02B 39/10* | (2006.01) |
| *F02B 39/12* | (2006.01) |
| *F02B 39/04* | (2006.01) |
| *F01N 3/20* | (2006.01) |
| *F01N 11/00* | (2006.01) |
| *F02B 37/12* | (2006.01) |
| *F02B 37/24* | (2006.01) |
| *F02B 37/18* | (2006.01) |

(52) U.S. Cl.
CPC .......... *F01N 11/002* (2013.01); *F02B 37/105* (2013.01); *F02B 39/04* (2013.01); *F02B 39/10* (2013.01); *F02B 39/12* (2013.01); *F01N 2560/00* (2013.01); *F01N 2560/02* (2013.01); *F01N 2560/06* (2013.01); *F01N 2560/07* (2013.01); *F01N 2560/08* (2013.01); *F01N 2560/14* (2013.01); *F01N 2900/1402* (2013.01); *F01N 2900/1404* (2013.01); *F01N 2900/1406* (2013.01); *F01N 2900/1411* (2013.01); *F02B 37/127* (2013.01); *F02B 37/18* (2013.01); *F02B 37/24* (2013.01); *F02B 2037/122* (2013.01); *Y02T 10/144* (2013.01); *Y02T 10/26* (2013.01)

(58) Field of Classification Search
CPC ..... F01N 2900/1404; F01N 2900/1406; F01N 2900/1411; F02B 2037/122; F02B 37/127; F02B 37/14; F02B 37/18; F02B 37/24; F02B 39/10; F02B 39/12; Y02T 10/144; Y02T 10/47
USPC ......... 60/274, 276, 280, 285, 287, 291, 299, 60/320, 324, 608
See application file for complete search history.

(56) References Cited

U.S. PATENT DOCUMENTS

| | | | |
|---|---|---|---|
| 7,765,805 B2 | 8/2010 | Lofgren | |
| 8,490,393 B2 | 7/2013 | Lofgren | |
| 8,490,394 B2 | 7/2013 | Lofgren | |
| 8,522,550 B2 | 9/2013 | Lofgren | |
| 8,528,330 B2 | 9/2013 | Lofgren | |
| 8,528,331 B2 | 9/2013 | Lofgren | |
| 2005/0091965 A1* | 5/2005 | Ries-Mueller | F02B 39/10 60/277 |
| 2006/0236692 A1* | 10/2006 | Kolavennu | F01N 3/0807 60/602 |
| 2006/0242950 A1* | 11/2006 | Wang | F01N 3/023 60/295 |
| 2008/0010974 A1* | 1/2008 | Frazier | F01N 11/002 60/277 |
| 2009/0025696 A1 | 1/2009 | Lovgren | |
| 2009/0183499 A1* | 7/2009 | Boorse | F01N 3/025 60/295 |
| 2010/0199956 A1 | 8/2010 | Lofgren | |
| 2010/0263374 A1* | 10/2010 | Tanaka | F02B 37/14 60/608 |
| 2011/0107739 A1* | 5/2011 | Shimizu | F01N 3/2006 60/273 |
| 2011/0126536 A1 | 6/2011 | Lofgren | |
| 2011/0131983 A1 | 6/2011 | Lofgren | |
| 2011/0131984 A1 | 6/2011 | Lofgren | |
| 2011/0138808 A1 | 6/2011 | Lofgren | |

FOREIGN PATENT DOCUMENTS

| | | | | |
|---|---|---|---|---|
| FR | 2855215 A1 | 11/2004 | | |
| SE | WO 2013004595 A1 | * | 1/2013 | ............... B60K 6/24 |
| WO | WO-2013004595 A1 | | 1/2013 | |

OTHER PUBLICATIONS

International Search Report PCT/ISA/210 for International Application No. PCT/SE2014/050339 dated Jul. 15, 2014.
Written Opinion of the International Searching Authority PCT/ISA/237 for International Application No. PCT/SE2014/050339 dated Jul. 15, 2014.

\* cited by examiner

SUPERCHARGING SYSTEM AND METHOD FOR OPERATING A SUPERCHARGING SYSTEM

FIELD OF THE INVENTION

The present invention relates to a supercharging system for an internal combustion engine, and a method for operating a supercharging system.

BACKGROUND ART

In the field of automotive industry, a lot of resources are and have been allocated towards developing systems for reducing the emissions of motive, or propulsion, systems by e.g. reducing the overall fuel consumption of internal combustion engines and propulsion systems comprising internal combustion engines, introducing systems and components such as exhaust gas catalyzers, etc.

Reduced fuel consumption has e.g. been achieved by providing supercharging systems, wherein a compressor is used for forced induction of an internal combustion engine. In more detail, intake manifold pressure is increased in order to decrease internal pumping and throttling losses which, in turn, allows for decreased fuel consumption. Such a system further enables downsizing of a vehicle engine without substantially interfering with the vehicle, and vehicle engine performance requirements.

In an internal combustion engine of piston type, gas exchange takes place via the normal flow of a homogeneous mixture of pure air mixed with fuel and outflow of the burnt mixture/exhaust through the intake and exhaust valves. After combustion and the working cycle's expansion in the cylinder the gas evacuates from the cylinder through the open exhaust valves.

In the case when an internal combustion engine is equipped with a turbocharger the turbine size, the turbine housing swallowing capacity and the turbine operating point affects the possible outflow. A restrictive state renders a higher pressure in the exhaust manifold than the less restrictive for example.

The exhaust gas pressure in the manifold in turn affects the volume and mass of burnt gases remaining in the cylinder when the exhaust valves are closed. The residual exhaust gases are very hot and remain in the cylinder when the intake process starts with the opening of the intake valve.

Exhaust gas catalyzers commonly comprise part of the exhaust system from the internal combustion engine, often having a honeycomb shaped ceramic material coated with a catalyst that reacts with the exhaust gases to convert the more harmful emissions into less harmful emissions. In order for the catalyst to work a number of conditions have to be fulfilled. Among these conditions the catalyst has a working temperature range outside of which the conversion rate is suboptimal to non-existing. Furthermore there are a number of other conditions that affect the performance of the exhaust gas catalyzer, such as air/fuel mixture and presence of other contaminants in the exhaust gases. Exhaust gas catalyzers are common components in modern vehicles and will therefore not be further described herein.

There are methods to bring and keep the exhaust gas catalyzer to its operating range that commonly comprise increasing the fuel ratio in the air/fuel mixture which as such may be counterproductive in terms of emissions. There is hence a need to provide a supercharging system that reduces emissions.

SUMMARY OF THE INVENTION

In view of the above-mentioned and other drawbacks of the prior art, a general object of the present invention is to provide a more efficient supercharging system.

According to a first aspect of the present invention there is provided a supercharging system for an internal combustion engine, comprising: a charging device having a turbine and a compressor, the compressor having a high speed shaft; a planetary gear set coupled to the high speed shaft and an electric motor, or generator, via a low speed drive shaft; a clutch unit; and a power transmission for connecting a crank shaft of the combustion engine to the drive shaft via the clutch unit; sensor means for measuring at least one physical parameter of the exhaust gases inside, or after having passed, an exhaust gas catalyzer of the internal combustion engine, the sensor means being configured to provide an output signal representing a measured value of the at least one physical parameter; and a system control unit which is configured to receive said output signal from the sensor means and configured to control the speed or effect of said electric motor, or generator, based on said output signal.

The present invention is based on the insight that by controlling the physical parameters in the exhaust system to the exhaust gas catalyzer of an internal combustion engine by means of controlling the speed or effect of the electric motor, or generator, of the supercharging system, it is possible to control the exhaust gas catalyzer in a sufficient manner to reduce emissions.

Controlling the speed or effect of the electric motor, or generator, based on output signals from the sensor means at the catalyzer, will enable control of the compressor speed and hence also the turbine speed. Hereby, the exhaust pressure will be controlled which in turn will affect the temperature of the exhaust gases in the exhaust system of the internal combustion engine. If, for example, controlling the electric motor, or generator, to increase its speed, the rotational speed of the compressor and the turbine will consequently be increased. Increasing the turbine speed will increase the pressure on the exhaust gas catalyzer which in turn will increase the temperature in the exhaust gas catalyzer. On the other hand, if it is desired to decrease the temperature of the exhaust gas catalyzer the supercharging system is configured to control the electric motor, or generator, to decrease its speed. Accordingly, by controlling the electric motor, or generator, it is possible to either add electrical power, or to reduce electrical power, to the supercharging system. This will consequently reduce the emissions, since the performance of the exhaust gas catalyzer is directly linked to a temperature operating range.

Reducing the turbine speed will reduce the exhaust back pressure from the internal combustion engine which in turn will reduce the mean temperature of the exhaust gases. Increasing the turbine speed increases exhaust back pressure which in turn increases the mean temperature of the exhaust gases. The turbine may in this manner work as an electric fully variable exhaust brake.

Fuels for engines have a defined resistance to uncontrolled knocking i.e. a resistance to go into unwanted combustion, as measured in a testing process that determines the octane rating. The propensity for a given engine to get into this unwanted combustion is controlled by several factors, one of which is the temperature, primarily in the not yet burnt gas mixture. The amount of residual gases directly affects the temperature and therefore the relationship in which gas exchange occurs, it is directly affecting the engine's tendency to go into the unwanted combustion, so-called knock. This may to some extent be managed by delayed ignition. However, delayed ignition may on the other hand give later and slower combustion, lower performance and lower efficiency of the engine. Reducing the turbine speed will reduce the exhaust back pressure from the internal combustion engine which in turn will reduce the mean temperature of the cylinders. This will reduce the risk of having uncontrolled knocking in the engine, since the in-cylinder mean temperature is directly linked to the engine knocking As described above, the sensor means may be arranged to measure one or more physical parameters of the exhaust gases after having passed the catalyzer, i.e. downstream of the catalyzer. Although, this may be sufficient for the desired control of the speed or effect of the electric motor, or generator, in at least one example embodiment, said sensor means may additionally measure one or more of said physical parameters before entering the catalyzer, i.e. upstream of the catalyzer. In such case, a comparison of the measured values in the output signals from the measurements before and after the catalyzer, respectively, is indicative of the state/performance of the catalyzer.

According to an example embodiment, the turbine may be a variable nozzle turbine (VNT) comprising at least one variable nozzle turbine vane, wherein the system control unit is adapted to control the speed or effect of the electric motor, or generator, in conjunction with the variable nozzle turbine vane based on the output signal from the sensor means.

According to an example embodiment, the supercharging system may further comprise an air by-pass valve, wherein the system control unit is adapted to control the speed or effect of the electric motor, or generator, in conjunction with an openness ratio of the air by-pass valve based on the output signal from the sensor means.

According to an example embodiment, the supercharging system may further comprise an operable waste gate, wherein the system control unit is adapted to control the speed or effect of the electric motor, or generator, in conjunction with the operable waste gate based on the output signal from the sensor means.

By controlling the electric motor, or generator, in conjunction with the variable nozzle turbine vane and/or the air by-pass valve and/or the waste gate, the system may more efficiently control exhaust gases.

Furthermore, by controlling the compressor bypass valve openness ratio relative to the electric motor speed ratio, it is possible to control the compressor operating point independently of engine operating point. Further, control of the operating point to avoid so called surge may also be achieved. According to an example embodiment, the system control unit may be further arranged to control the rotational speed of the charging device according to a reference speed value based on at least one parameter representative of an operational property of the supercharging system provided to the system control unit.

The electric motor, or generator, may comprise an optional sensor arranged to generate a motor speed parameter value representative of the rotational speed of the electric motor, or generator; wherein the system control unit may be arranged to control the rotational speed of the charging device based on the motor speed parameter in conjunction with the output signal from the sensor means according to a control algorithm.

For example, the optional sensor may be arranged as a separate unit and/or be at least partly formed by the electric machine itself.

Moreover, the electric motor, or generator, sensor can be used to monitor actual (real-time) turbo speed without having a turbo speed sensor. This may for example be achieved by calculations of electric machine/generator sensor parameter values compensated, or multiplied, with the planetary gear/traction device ratio. Furthermore, for gears/transmissions, such as traction drives or variable transmission gear sets, a slip coefficient may be added to the calculations in order to provide a more correct turbo speed measurement.

A variable nozzle turbine, and/or a turbine with a variable nozzle vane(s), allow for the possibility of controlling the turbine while maintaining high operational efficiency. For example, the turbine vanes may be rotated such that the effective area of the vanes and, thus, the effective mass flow of, or through, the turbine for a given pressure ratio may be improved.

According to an example embodiment, the variable nozzle turbine vane may be arranged to adjust turbine efficiency of the charging device based on sensor signal from the electric motor and/or an engine control unit.

According to an example embodiment, the system control unit may include a control algorithm to control at least one actuator of the variable nozzle turbine vane, or vanes.

According to an example embodiment, the charging device is a first charging device with a first turbine and a first compressor, wherein the supercharging system may further comprise a second charging device with a second turbine connected to a second compressor via a second compressor shaft, wherein the system control unit is arranged to control a parameter representative of pressure and/or mass flow of the first charging device in relation to the second charging device during matching between the first and to the second charging device.

It should be noted that the above described system control unit may control any of the described devices, either as a sole unit or by means of sub-units connected to the system control unit.

According to an example embodiment, the supercharging system may further comprise an operable first waste gate coupled between an inlet side of the first turbine and an inlet side of the second turbine.

According to an example embodiment, the supercharging system may further comprise a second waste gate coupled between the inlet side of the second turbine and an outlet side.

According to an example embodiment, the air by-pass valve may be a first air by-pass valve, wherein the supercharging system may further comprise a second air by-pass valve.

According to an example embodiment, the first charging device may be a variable nozzle turbine, the system control unit may be operatively connected to the supercharging system to determine and control the state of the variable nozzle turbine, the first, second and third clutches, the electric motor, or generator, the first and second air by-pass valves, and the first and second waste gates.

According to an example embodiment, the system control unit may be configured to operate the supercharging system according to a control algorithm based on one, or a plurality of, physical parameters from the sensor means, wherein the physical parameters from the sensor means comprises at least one of the following:

a first pressure and/or mass flow parameter representative of exhaust gases at a first sensor means;
  a first temperature parameter representative of exhaust gases at a first sensor means;

a first gas composition parameter representative of exhaust gases at a first sensor means;
a second pressure and/or mass flow parameter representative of exhaust gases at a second sensor means;
a second temperature parameter representative of exhaust gases at a second sensor means;
a second gas composition parameter representative of exhaust gases at a second sensor means;
a third pressure and/or mass flow parameter representative of exhaust gases in the exhaust gas catalyzer;
a third temperature parameter representative of exhaust gases in the exhaust gas catalyzer;
a third gas composition parameter representative of exhaust gases in the exhaust gas catalyzer;

In the context of the present invention it should be understood that gas composition could mean level of oxygen in the exhaust gases, or exhaust gas composition could for example mean air/fuel mixture or level of harmful emissions such as carbon monoxide.

The performance and operating conditions of exhaust gas catalyzers may be measured by providing output signals from sensor means after and/or inside the exhaust gas catalyzer (and, optionally, before the catalyzer). For example it may be possible to measure a temperature inside the exhaust gas catalyzer to determine if the exhaust gas temperature needs to be increased to reach operating temperature. It may also be possible to measure for example change in temperature or exhaust gas composition between sensor means located before and after the exhaust gas catalyzer.

In the context of the present invention the portion of the exhaust system located between the internal combustion engine and the exhaust gas catalyzer may be considered to be before the exhaust gas catalyzer. Consequently in the context of the present invention, the portion of the exhaust system between the exhaust gas catalyzer, through any silencer, and to the exterior may be considered to be after the exhaust gas catalyzer.

It should be understood that the first and/or second sensor means may be placed at any one of these measuring locations.

According to an example embodiment, the supercharging system may further comprise an engine control unit and/or a vehicle control unit arranged to determine a first vehicle parameter representative of engine rpm, a second vehicle parameter representative of an engine throttle position and/or derivatives thereof, and a third vehicle parameter representative of a driver pedal position and/or derivatives thereof, wherein the system control unit is arranged to additionally control the supercharging system based on the first, second and third vehicle parameters.

According to a second aspect of the present invention there is provided a method for operating a supercharging system for an internal combustion engine including an exhaust gas propelled turbo supercharging system, a mechanical supercharging system, and an electrical supercharging/regenerating system; wherein the exhaust gas propelled turbo supercharging system includes a charging device; the charging device comprising a turbine and a compressor, the compressor being arranged on a compressor shaft; the exhaust gas propelled turbo supercharging system coupling the turbines to at least one exhaust outlet of the internal combustion engine, the electrical supercharging/regenerating system coupling an electric motor, or generator, to the compressor shaft via a planetary gear set, and the mechanical supercharging system coupling a crank shaft of the engine to the electric motor via a clutch, the method comprising: measuring at least one physical parameter of the exhaust gases inside and/or after having passed an exhaust gas catalyzer of the internal combustion engine, providing an output signal representing a measured value of said at least one physical parameter, controlling the speed or effect of said electric motor, or generator, based on the output signal.

According to an example embodiment, the at least one physical parameter includes pressure and/or mass flow, the method further comprising driving the turbine of the charging device with the electric motor until said output signal reaches a predetermined reference value and/or range.

According to an example embodiment, the at least one physical parameter includes pressure and/or mass flow, the method further comprising driving the turbine of the charging device with the electric motor while said output signal maintains a predetermined reference value and/or range.

According to an example embodiment, the at least one physical parameter includes temperature, the method further comprising driving the turbine of the charging device with the electric motor until said output signal reaches a predetermined reference value and/or range.

According to an example embodiment, the at least one physical parameter includes temperature, the method further comprising driving the turbine of the charging device with the electric motor while said output signal maintains a predetermined reference value and/or range.

According to an example embodiment, the at least one physical parameter includes exhaust gas composition, the method further comprising driving the turbine of the charging device with the electric motor until said output signal reaches a predetermined reference value and/or range.

According to an example embodiment, the at least one physical parameter includes exhaust gas composition, the method further comprising driving the turbine of the charging device with the electric motor while said output signal maintains a predetermined reference value and/or range.

According to an example embodiment, the method further comprising, at start of the internal combustion engine, driving the turbine of the charging device with the electric motor, for reducing "light-off" time. During cold start of the internal combustion engine the operational effect of the exhaust gas catalyzer is low or non-existent and the "light-off" time should be interpreted as the time until the operational temperature is reached in the context of the present invention. Reducing the "light-off" time consequently reduces the harmful emissions from an internal combustion engine.

According to an example embodiment, the at least one physical parameter includes emission levels, the method further comprising driving the turbine of the charging device with the electric motor, during an exhaust gas catalyzer regeneration process.

Internal combustion engines having exhaust gas catalyzers may have issues with residues. Most commonly this is the case with diesel engines having an additional diesel particulate filter, in which there may be a build-up of soot residues. Removing the residues is commonly done in a regeneration process where the exhaust gases are heated by an addition of fuel. As this is common in modern vehicles this will not be explained further in this document. Driving the turbine of the charging device with the electric motor may reduce the frequency of the regeneration process or the amount of additional fuel combusted, and consequently reduce the harmful emissions.

According to an example embodiment, the supercharging system further comprises at least one of an internal combustion engine throttle, variable vanes, an air by-pass valve, a waste gate and an engine control unit, and the method further comprises controlling at least one of the throttle, variable vanes, air by-pass valve, waste gate and variables in the engine control unit for counteracting pressure built by the compressor when the turbine is driven.

Effects and features of this second aspect are largely analogous to those described above in relation to the first aspect of the present invention.

Generally, other objectives, features, and advantages of the present invention that will appear from the following detailed disclosure, from the attached dependent claims as well as from the drawings are equally possible within the scope of the invention.

BRIEF DESCRIPTION OF DRAWINGS

Embodiments of the invention will now be described, by way of example, with reference to the accompanying drawings, wherein.

Figure 1A:
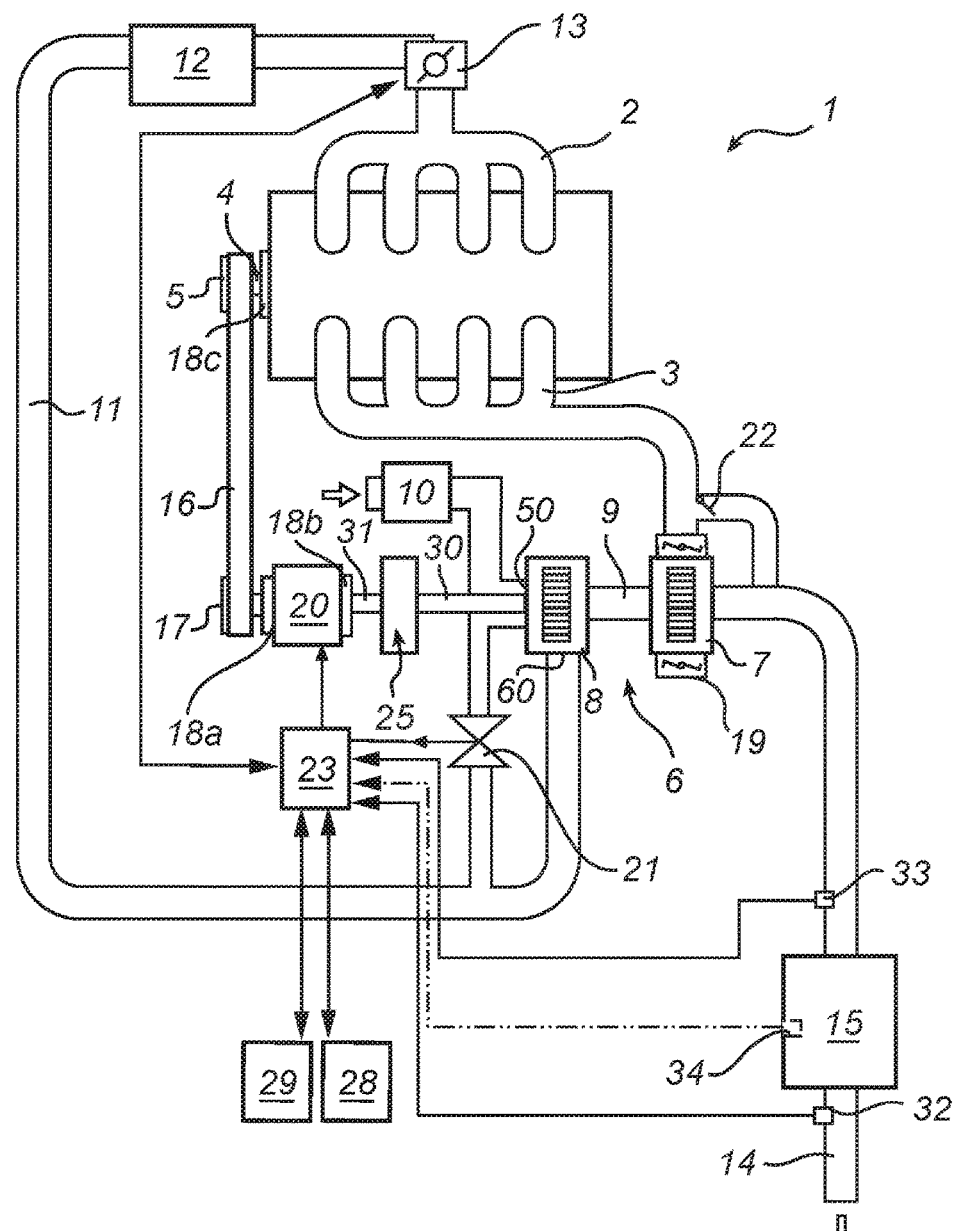
FIG. 1a illustrates a schematic side view of an internal combustion engine equipped with a supercharging system according to an embodiment of the present invention.

It should be understood that the drawings are only schematic and not true to scale and, as is readily appreciated by a person skilled in the art, dimensions other than those illustrated in the drawings are equally possible within the scope of the invention.

DETAILED DESCRIPTION OF EMBODIMENTS OF THE INVENTION

FIG. 1a shows an internal combustion engine 1 having an air intake manifold 2 with four air intake pipes, intimating that the engine has four cylinders. However, the number of cylinders can be higher as well as lower. The internal combustion engine 1 further has an exhaust gas manifold 3, having four exhaust gas pipes for the four cylinders of the engine.

Attached to the engine block is a supercharging system 6 comprising a turbo charging device comprising a turbine 7 and a compressor 8 arranged on a common shaft 9 in such a way that when the turbine rotates the compressor rotates simultaneously. The compressor 8 is connected to a high-speed shaft 30 projecting in the opposite direction to the common turbine/compressor shaft 9. The turbine is driven by the exhaust gases from the exhaust gas manifold 3, and an impeller (not shown) of the co-rotating compressor 8 is compressing ambient air which is sucked in via an air filter 10. The compressed air is lead through a duct 11 via an intercooler 12 and a throttle 13 into the internal combustion engine 1 through the air intake manifold 2, whereas the exhaust gases after having passed the turbine are evacuated via an exhaust gas conduit 14 with a catalyzer 15. The throttle may for example be an electrically controlled throttle.

The engine 1 has a crankshaft 4 which protrudes outside the engine and is equipped with a pulley 5. The pulley 5 is rotating with the crankshaft 4 of the engine and transfers via a belt drive 16 rotation to a shaft 17, which via a one way clutch 18a is coupled to an electric machine 20, which in turn is coupled through a low-speed shaft 31 to a ring gear wheel (not shown) of a planetary gear set 25 with planet gear wheels (not shown) and a sun gear wheel (not shown) connected to the high-speed shaft 30. In this manner the rotation of the crank shaft 4 can be transferred to the common shaft 9, which is the common shaft for the turbine 7 and the compressor 8, in situations where the turbine has not reached its working area. The belt drive described is not limited to be a belt drive, any type of appropriate transmission units can be used. The clutch unit mentioned can be mechanical one way clutches of any appropriate type, although electric clutches, viscous couplings and corresponding means are also possible.

The engine also incorporates a compressor air by-pass valve 21 and a waste gate 22. The compressor air by-pass valve 21 is controlled by way of a system control unit 23, based on different engine and supercharging system behaviour parameters, will operate for maintaining the rotational speed of the turbine as high as possible in order to avoid dangerous pressure increase at the exhaust side. The system control unit 23 is further operatively connected to an engine control unit 28, and a vehicle control unit 29.

Furthermore, the system 1 comprises power transmission 16, such as a belt drive, which operatively connects the common axis of the electric machine 20 and low speed shaft 31, via a first clutch 18a and third clutch 18c, to the crankshaft 4 of the engine 1, such that rotational power may be transferred between the crankshaft and the common axis of the electric machine 20, the low speed shaft 31, planetary gear set/traction device 25, and the high speed shaft 30, depending on the configuration of the clutches 18a and 18b.

For example, the high-speed shaft 30 may be used for providing rotational power from the electric machine to the first charging device for enabling e.g. electrically powered charging of the internal combustion engine, referred to as e-boost, or for enabling mechanically powered turbo charging of the engine by using mechanical rotational power from the internal combustion engine. The high speed shaft 30 may also be used for obtaining, or extracting, the rotational power generated in the charging device, typically in the turbine, and to convert this produced rotational power into electric energy by means of the electric motor which is configured to operate as a generator and which is connected to the drive shaft, or to convert the rotational power into mechanical power by means of the power transmission 16.

Furthermore, the system 1 comprises sensor means, for measuring physical parameters of the exhaust gases, for example such as sensor means 33 before the catalyzer 15 and/or sensor means 32 after the catalyzer 15. Additional or alternative sensor means 34 may be comprised in the catalyzer 15 itself. As stated the sensor means are provided for measuring physical parameters of the exhaust gases and providing at least one output signal representing a measured value of at least one physical parameter. All sensor means are connected to the system control unit 23, which is configured to receive at least one output signal.

The at least one physical parameter is selected for being representative of the performance and/or operating conditions of the catalyzer 15. For example it may be possible to measure a temperature inside the catalyzer 15 to determine if the exhaust gas temperatures are high enough for the catalyzer 15 to reach operating temperature. The operating temperature may typically be above 200-300 degrees Celsius. It may also be possible to measure for example change in temperature or exhaust gas composition between sensor means 33 located before the catalyzer 15 and sensor means 32 located after the catalyzer 15.

With the described supercharging system of FIG. 1*a*, the supercharging system is hence further configured to control physical parameters of the exhaust gases, for the purpose of reducing harmful emissions. This can be accomplished by controlling the electric motor, or generator, 20 speed based on the output signal or output signals from said sensor means. By controlling the speed of the electric motor, or generator, 20, the speed of the compressor 8 as well as the turbine 7 is controlled. Hereby the pressure of the exhaust gases may be controlled, which in turn will affect the temperature of the exhaust gases flowing through the catalyzer 15. Furthermore, the exhaust back pressure may also be controlled which in turn will affect the in-cylinder temperature of the cylinders in the internal combustion engine 1. Hereby, if the speed of the electric motor, or generator, 20 is, for example, increased, the in-cylinder mean temperature will in turn be increased, and consequently the exhaust gas flowing to the catalyzer 15 will have a higher temperature.

Figure 1B:
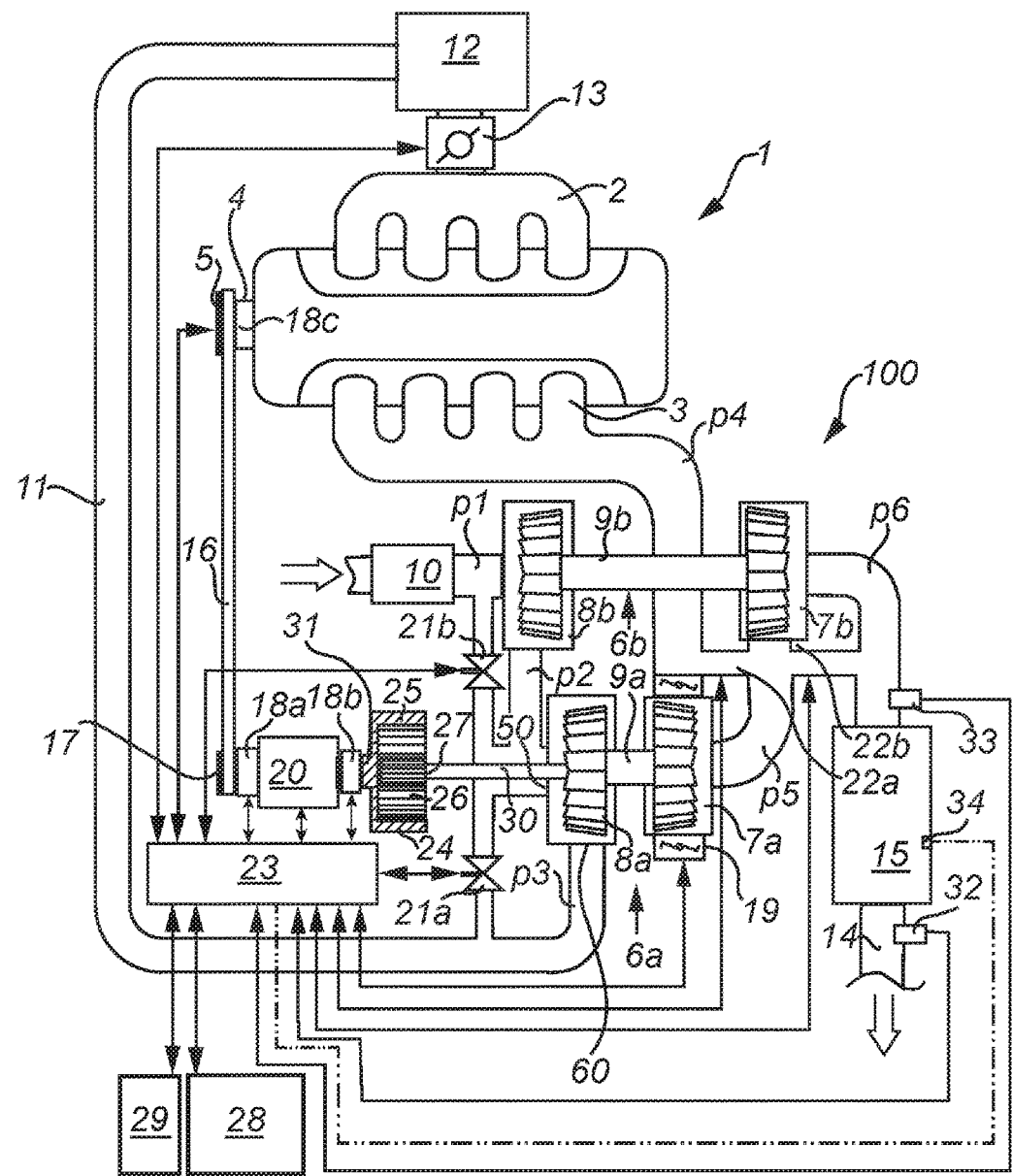
FIG. 1b is a schematic view of a supercharging system and a hybrid drive system according to an embodiment of the present invention.

In FIG. 1*b*, a schematic view of a supercharging system 100 and/or hybrid drive system 100 according to an embodiment of the present invention, is illustrated. The supercharging system 100 comprises an internal combustion engine 1, in the following also referred to as the engine 1, comprising an intake manifold 2 for allowing compressed air to enter into the engine 1. The engine 1 further comprises an exhaust manifold 3 for exhaust gases leaving the engine 1, which exhaust gases are used for driving turbines 7*a* and 7*b* of a first charging device 6*a* and a second charging device 6*b*, respectively. The engine further comprises a crankshaft which is arranged to provide rotational power for propelling a vehicle, such as a car, truck, lift-truck, construction vehicle, bus, ship, boat, aircraft, or other vehicles or crafts, via a propulsion drive line. A crankshaft pulley 5 is connected to the crankshaft 4, which pulley 5 forms part of a belt drive power transmission between the crankshaft 4 and an electric machine 20. However, the power transmission between engine and electrical motor is not limited to a belt drive transmission.

As illustrated, the system 100 comprises a first charging device 6*a* comprising a first turbine 7*a* being arranged downstream of, in relation to the exhaust gas flow, and connected to the exhaust gas manifold 3, and a first compressor 8*a* for generating compressed air to be supplied to the engine 1. The first turbine 7*a* is connected via a first compressor shaft 9*a* to the first compressor 8*a*, such that rotational power provided by the exhaust gases from the engine to the first turbine 7*a* may be transferred to the first compressor 8*a*. The system 100 further comprises a second charging device 6*b* comprising a second turbine 7*b* being arranged downstream of, in relation to the exhaust gas flow, and connected to the outlet side of the first turbine 7*a*, and a second compressor 8*b* for generating compressed air to be supplied to the engine 1. The second turbine 7*b* is connected via a second compressor shaft 9*b* to the second compressor 8*b*, such that rotational power provided by the exhaust gases from the engine to the second turbine 7*b* may be transferred to the second compressor 8*b*. Hence, the second charging device 6*b* is arranged sequentially after the first charging device 6*a*, in relation to the exhaust gas flow. However, the invention is not limited to this configuration, and the second charging device 6*b* may be arranged before, or in a parallel configuration with, the first charging device 6*a*, in relation to the exhaust gas flow.

On an exhaust gas system side of the system 100, it further comprises a first waste gate 22*a* and second waste gate 22*b* which enable bypassing of the exhaust gases in relation to the first turbine 7*a* and the second turbine 7*b*, respectively, either independently or in combination. For example, if partially opened, the waste gates 22*a*, 22*b* enable bypassing of at least a portion of the exhaust gas directly to an exhaust system outlet 14, via an exhaust gas catalyzer 15 and sensor means 32 downstream of the catalyzer 15, relative to the exhaust gases, and optionally via a sensor means 33 upstream of the catalyzer 15, relative to the exhaust gases.

On a compressor system side of the system 100, air from an air inlet and air inlet filter 10 is compressed and provided to the engine e.g. via engine air inlet ducts 11, intercooler 12 and/or throttle 13. The air is at least partly compressed by the first compressor 8*a* and the second compressor 8*b*, independently or in combination, depending on the configuration of a first air by-pass valve 21*a* and a second air by-pass valve 21*b*.

By adjusting the air by-pass valves 21*a*, 21*b* and the waste gates 22*a*, 22*b*, the relative operation of the first and second charging device 6*a* and 6*b* may be adjusted in relation to each other, such that only one is operational in a single stage operational mode, or both are operational in a combined operational mode wherein the operational ratio between the first and second charging devices may be suitably adjusted.

As further illustrated, the first charging device 6*a* is arranged along a common axis with, and operatively connected to, via a planetary gear set/traction device 25, to the electric machine 20 comprising an electrical motor/generator such that the electrical machine 20 may, according to various embodiments, operate both an electric motor and/or as an electrical generator.

As schematically illustrated, the planetary gear set/traction device 25 comprises e.g. a ring wheel 24, two or a plurality of planet wheels 26, and a sun wheel 27. In more detail, a high speed shaft 30 of the first charging device 6*a*, which high speed shaft 30 is connected to and extends from the first compressor shaft 9*a*, is connected to the sun wheel 27, on a high speed side of the planetary gear set/traction device 25. On the other side of the planetary gear set/traction device 25, on a low speed side, a low speed shaft 31 is connected to and provided between the ring wheel 24 and a second clutch 18*b*. The second clutch 18*b* connects the low speed shaft with the electrical machine 20, or, in more detail, a rotor member of the electric machine 20.

As illustrated, the low speed shaft 31 on the low speed side of the planetary gear set/traction device 25 coincides with the axis of the electrical machine 20. Hence, the low speed shaft 31 is also coupled to the crankshaft 4 of the engine 1 via clutches 18*a*, 18*b*, and 18*c*.

However, the electrical machine 20 may be arranged separated from and connected to the low speed shaft 31 via a suitable transmission, such as a belt drive. Furthermore, the electrical machine 20 may be operatively connected to the common axis of the high speed shaft 30 and low speed shaft 31 on the high speed side of the planetary gear set/traction device 25. For example, a high speed electrical machine may be used and operatively connected to the high speed shaft 30, optionally via a clutch.

As further illustrated, the first charging device includes a variable nozzle turbine (VNT) which comprises variable vanes 19 which may be adjusted by the control system unit 23 in order to adapt the turbine to current exhaust gas flow condition and the operational mode of the supercharging system. The control system unit 23 is further operatively connected to an engine control unit 28, and a vehicle control unit 29. The control system unit 23 is connected to and arranged to control the first 18*a*, second 18*b* and third 18*c* clutches, the first and second air by-pass valves 21a, 21b and the waste gates 22a, 22b, and the engine's throttle 13 according to the different operating modes of the supercharging system and hybrid drive system 100.

The control system unit 23 may further be operatively connected to sensors, additional to the sensor means arranged after 32, inside 34 (as in FIG. 1a) and/or before 33 the catalyzer 15. The additional sensor being arranged to output observation parameter values representative of air/exhaust gas pressure and/or mass flow at a plurality of observation points, or regions, such as the illustrated intake air point p1, second compressor point p2, first compressor point p3, exhaust gas point p4, first turbine point p5, and second turbine point p6.

The supercharging system described above and depicted in FIG. 1b can also, as described above in relation to the description of FIG. 1a, control physical parameters of the exhaust gases, for the purpose of reducing harmful emissions. This can be accomplished by controlling the electric motor, or generator, 20 speed. By controlling the speed of the electric motor, or generator, 20, the speed of the compressor 8 as well as the turbine 7 is controlled. Hereby, the pressure of the exhaust gases may be controlled, which in turn will affect the temperature of the exhaust gases flowing through the catalyzer 15. Furthermore, the exhaust back pressure will be controlled which in turn will affect the in-cylinder mean temperature of the cylinders in the internal combustion engine 1. Hereby, if the speed of the electric motor, or generator, 20 is, for example, increased, the in-cylinder mean temperature will in turn be increased, and consequently the exhaust gas flowing to the catalyzer 15 will have a higher temperature.

Figure 2A:
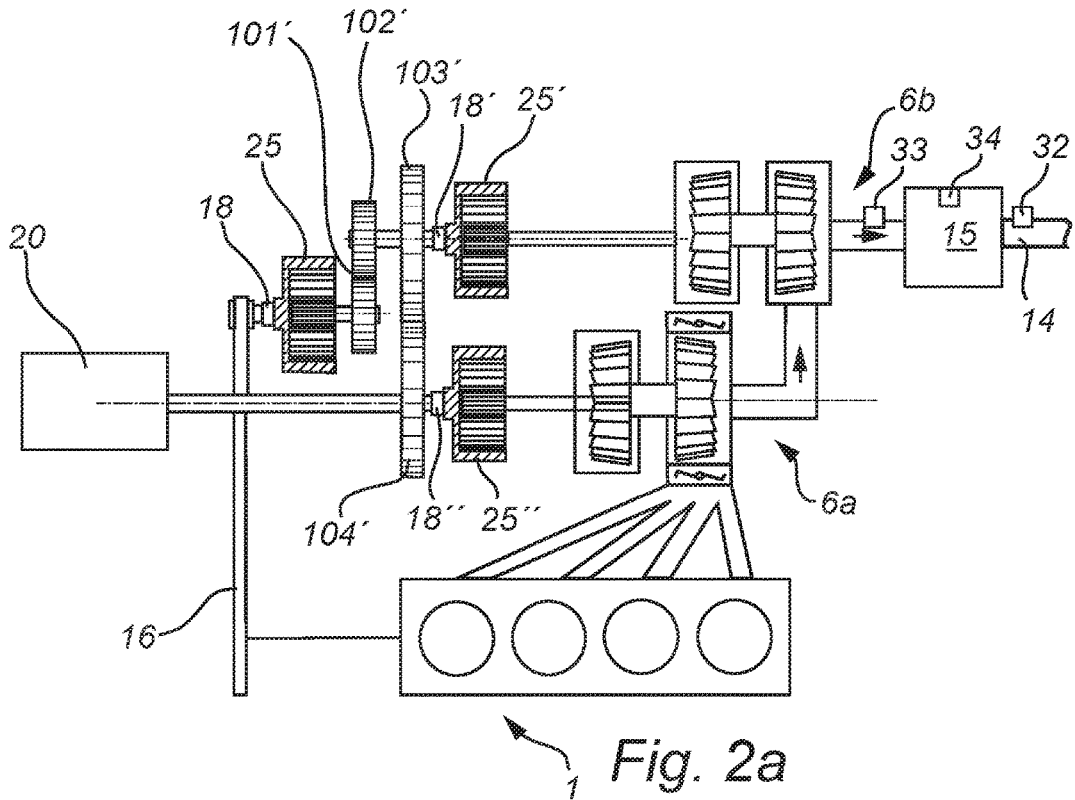
FIGS. 2a-2b illustrate example embodiments of a supercharging system according to the present invention.
Figure 2B:
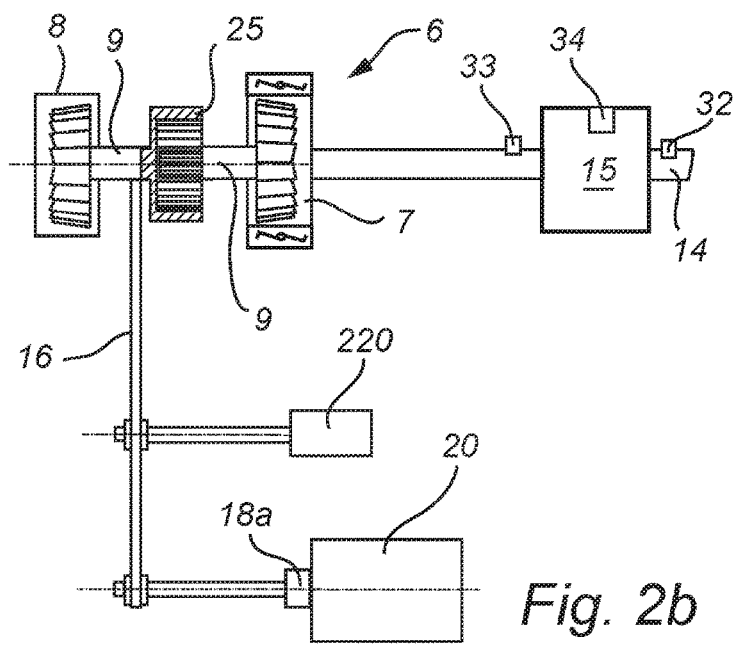

Attention is now drawn to FIGS. 2a-2b, which illustrate further example embodiments of a supercharging system according to the present invention, according to which an electric motor, or generator, 20 is arranged to control rotational speed of a charging device for controlling the physical properties of the exhaust gases and thereby reducing harmful emissions.

Starting with FIG. 2a, which illustrates an alternative embodiment of the supercharging system illustrated in FIG. 1b. Although only sensor means 32, 33 have been illustrated, a sensor means inside the catalyzer is additionally or alternatively conceivable, in line with the above discussions. The supercharging system depicted in FIG. 2a comprises three planetary gear sets 25, 25', 25", where the sun wheel of the first planetary gear set 25 is connected a first gear 101' which is in meshed connection with a second gear 102'. Moreover, a third gear 103' is arranged between the second gear 102' and the ring gear of the second planetary gear set 25', wherein the third gear 103' is in meshed connection with a fourth gear 104' being arranged between an electric motor, or generator, 20 and the ring gear of the third planetary gear set 25".

Furthermore, the supercharging system also comprises two charging devices 6a, 6b which each are coupled to the second 25' and third 25" planetary gear sets respectively.

By means of the supercharging system depicted in FIG. 2a, the charging devices 6a, 6b can run independently of each other or be configured to run at different rotational speed. Moreover, an internal combustion engine 1 is also provided to the supercharging system depicted in FIG. 2a. The internal combustion engine is connected to the first charging device 6a in a similar manner as described in relation to FIG. 1b. With the illustrated supercharging system of FIG. 2a, it is hence possible to run only the first charging device 6a while keeping the second charging device in e.g. idle position. The same is applicable the other way around, i.e. to run the second charging device 6b and keeping the first charging device 6a in e.g. idle position. Still further, the supercharging system depicted in FIG. 2a may also run the first charging device 6a and the second charging device 6b simultaneously. Hereby, the power balance between the two charging devices, and hence the turbo shaft speed, will be controlled. Also, the crankshaft is coupled to the first planetary gear set 25 via a power transmission 16.

Accordingly, the mechanical power, in the form of rotational speed or torque, from the internal combustion engine 1 can be provided to the first planetary gear set 25, via the power transmission 16 and a clutch 18. By means of the first 101', second 102', third 103' and fourth 104' gear, the mechanical power can either be provided to the first charging device 6a via the third planetary gear set 25" and a clutch 18", or to the second charging device 6b, via the second planetary gear set 25' and a clutch 18', The mechanical energy can also be provided to both of the first charging device 6a and the second charging device 6b. To control the mechanical energy to be provided to either the first charging device 6a, the second charging device 6b or to both. Clutches 18', 18" are used in the illustrated embodiment of FIG. 2a. However, such clutches and how they work is considered to be known by the skilled person and can therefore of course be provided in other configurations as the one illustrated in FIG. 2a. Also, instead of, or as a complement to the clutches, the various paths for transferring mechanical energy can be realized by e.g. controlling the first gear 101' and third gear 103'. For example, it may be possible to axially move the first gear 101' and the third gear 103', respectively, so they alter between a meshed connection and an un-meshed connection with their respective second gear 102' and fourth gear 104'.

Also, with the supercharging system depicted in FIG. 2a, it is possible to provide thermal energy from the internal combustion engine to the turbine of the first charging device 6a. The compressor shaft of the first turbine can then convert the thermal energy to mechanical energy and, via the fourth gear 104' and third gear 103' and the second planetary gear set 25" provide the energy to the second charging device 6b.

Turning to FIG. 2b, a planetary gear set 25 is positioned between the turbine and the compressor of the charging device 6. The sun wheel of the planetary gear set is coupled to the high-speed shaft 9 and also acts as bearing support for the high-speed shaft. The internal combustion engine is not included in the depicted embodiment of FIG. 2b, but it should be readily understood that such internal combustion engine of course is connectable to the illustrated embodiment of the supercharging system.

Moreover, the supercharging system illustrated in FIG. 2b is configured to distribute energy from the exhaust gases, either mechanically or electrically. The energy from the exhaust gases may, for example, be converted to mechanical energy by the high-speed shaft and via sun wheel and the ring wheel of the planetary gear set 25 be provided to the power transmission and further to the electric motor 20 which then act as a generator and hence convert the mechanical energy into electrical energy. The electrical energy can be stored in a battery or be used in the electrical vehicle system. The energy from the exhaust gases may be provided to auxiliary components 200 of the supercharging system or auxiliary components of the vehicle onto which the supercharging system is installed. Also, energy from the charging device may also be provided to the internal combustion engine.

Similarly to the previously illustrated embodiments, in the embodiment in FIG. 2b, sensor means may be provided for measuring at least one physical parameter of the exhaust gases at a catalyzer and providing an output signal representative of a measured parameter value to a control unit, which based on the output signal controls the speed or effect of the electric motor 20.

Figure 3:
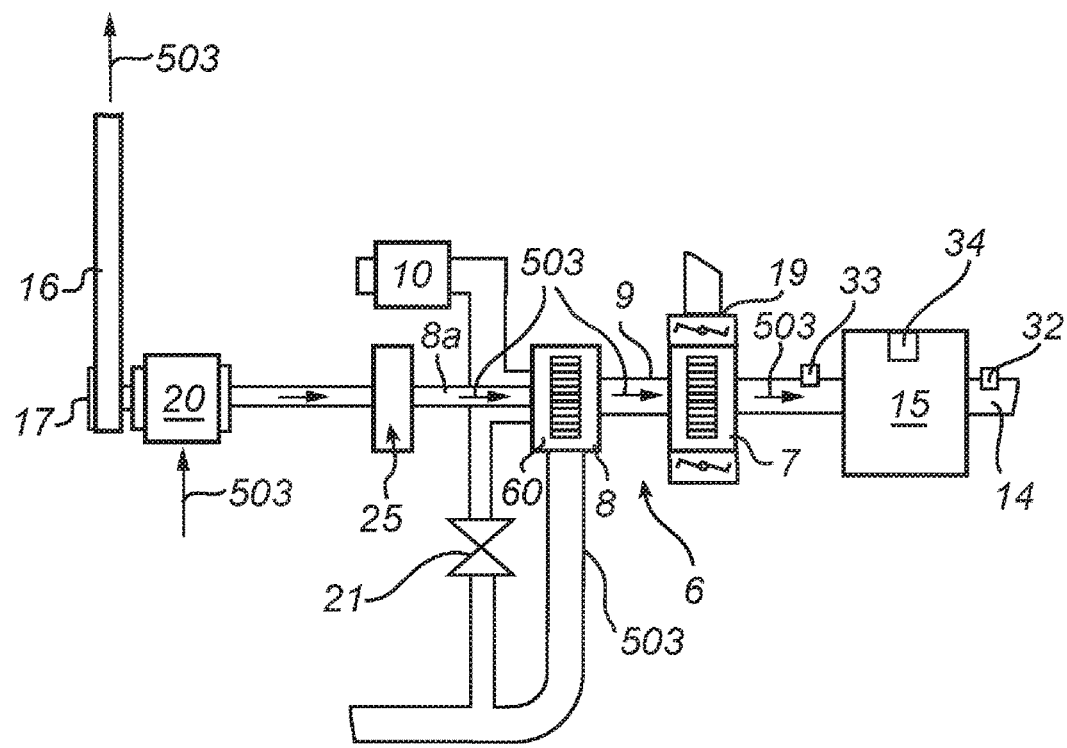
FIG. 3 illustrates in detail an example embodiment of a power distribution in a supercharging system.

Turning now to FIG. 3 which illustrates an example embodiment of power distribution in an exemplary supercharging system in accordance with the present invention. The power distribution illustrated in FIG. 3 is depicted for the supercharging system illustrated in FIG. 1a. It should, however, be readily understood that the below described power distribution is also applicable for other embodiments of the supercharging system according to the present invention.

Reference is made to FIG. 3, which illustrates how electrical energy from e.g. a battery or a corresponding source of electrical energy may be provided to the system via the electric motor, or generator, 20. As indicated by the arrow 503, electrical energy is provided to the electric motor, or generator, 20 from e.g. a battery (not shown) of the vehicle. The electrical energy may be converted into mechanical energy by the electric motor, or generator, 20 and provided to the turbine 7. In the turbine 7 the mechanical energy is converted into thermal energy, as described above, which may be outputted to the catalyzer 15 through the exhaust 14. During this operation of the supercharging system it may be preferable to separately control the operating conditions of the internal combustion engine 1. The mechanical energy is simultaneously provided to the compressor which converts the energy into thermal energy, which may be outputted to the internal combustion engine through the compressor outlet side 60. The energy may be diverted or reduced from being outputted to the internal combustion engine by controlling at least one of the throttle 13, variable vanes 19, air by-pass valve 21, waste gate 22, and/or variables in the engine control unit 28.

Alternatively, the electrical energy may be converted into mechanical energy and provided to the internal combustion engine via the power transmission 16. Hereby, the electric motor, or generator, 20 can, for example, start up the internal combustion engine, or drive the crank shaft of the internal combustion engine. The mechanical energy converted by the electric motor, or generator, 20 and provided to the power transmission may also be used to drive auxiliaries of the vehicle. However, the electrical energy can, instead of or as a complement, be converted into mechanical energy by the electric motor, or generator, 20 and provided to the compressor 8. In the compressor 8 the mechanical energy is converted into thermal energy, as described above, which can be outputted to the internal combustion engine through the compressor outlet side 60.

The described flow of energy depicted in FIG. 3 is described to occur during an example embodiment operation of the present invention. Furthermore, the electric motor, generator, 20 should also be interpreted as an electric motor when emitting electrical power through the described supercharging system, and as a generator when extracting electrical power from the same supercharging system.

With the above described supercharging systems, a plurality of advantages are provided in relation to prior art, for example:
- the fuel consumption may be lowered since the backpressure may be lowered in comparison to prior art turbocharged engines, while still keeping the same torque and rpm.
- a pumping mean effective pressure may be lowered by means of lowered backpressure and intake pressure when braking.
- Reduce load on the crankshaft by means of taking energy from the exhaust gases electrically and/or mechanically, to drive electrical and/or mechanical auxiliaries.
- by having a by-pass valve in combination with an electric machine makes it possible to choose compressor working point independently of the internal combustion engine working point, as well as to some extent independently of the working point of the turbine.
- lower fuel consumption and lower pump losses due to the use of e-boost.
- possibility to re-use redundant exhaust gas energy as power to the crankshaft, which in turn may reduce fuel consumption.
- energy losses in the throttle may be reduced by controlling the by-pass valve.
- by controlling the by-pass valve it is possible to avoid the surge line and hence minimize the risk of entering surge in the compressor map.
- optimum engine performance during acceleration by controlling electric motor speed with respect to the pressure and mass flow in order to follow compressor surge line.
- by controlling the electric machine, by-pass valve, waste gate and variable nozzle turbine it is possible to shorten the time period for a so-called "light-off" time for the catalyzer by increasing the exhaust gas temperature faster than prior art turbocharger engines. The "light-off" time should be interpreted as the time it takes until the catalyzer reaches its working temperature.
- by controlling the electric machine, by-pass valve, waste gate and variable nozzle turbine it is possible to reduce the frequency and/or fuel combusted for a so-called "regeneration process" by increasing the exhaust gas temperature in a new way compared to prior art turbocharger engines. The "regeneration process" should be interpreted as the process where the temperature of the exhaust gases is increased to burn residues from emissions that have deposited in the catalyzer and/or diesel particular filter.

It should be noted that the invention has mainly been described above with reference to a few embodiments. However, as is readily appreciated by a person skilled in the art, other embodiments than the ones disclosed above are equally possible within the scope of the invention, as defined by the appended patent claims.

It is further noted that, in the claims, the word "comprising" does not exclude other elements or steps, and the indefinite article "a" or "an" does not exclude a plurality. A single apparatus or other unit may fulfill the functions of several items recited in the claims. The mere fact that certain features or steps are recited in mutually different dependent claims does not indicate that a combination of these features or method steps cannot be used to advantage.

The invention claimed is:

1. A supercharging system for an internal combustion engine, comprising:
    a charging device including a turbine and a compressor, said compressor having a high speed shaft;
    a planetary gear set coupled to said high speed shaft and an electric motor or generator, via a low speed drive shaft;
    a clutch unit;

a power transmission for connecting a crank shaft of the combustion engine to the low speed drive shaft via the clutch unit;

at least one sensor to measure at least one physical parameter of exhaust gases inside, or after having passed, an exhaust gas catalyzer of said internal combustion engine, the at least one sensor being configured to provide a plurality of output signals, each output signal representing a measured value of said at least one physical parameter; and a system control unit, configured to receive each of said plurality of output signals from the at least one sensor and configured to control, by increasing or decreasing speed or effect of said electric motor or generator, based on each of said plurality of output signals.

2. The supercharging system according to claim 1, wherein the turbine is a variable nozzle turbine comprising at least one variable nozzle turbine vane, wherein the system control unit is adapted to control the speed or effect of said electric motor or generator, in conjunction with said variable nozzle turbine vane based on the plurality of output signals from said at least one sensor.

3. The supercharging system according to claim 1, further comprising an air by-pass valve, wherein the system control unit is adapted to control the speed or effect of said electric motor or generator, in conjunction with an openness ratio of said air by-pass valve based on the plurality of output signals from said at least one sensor.

4. The supercharging system according to claim 1, further comprising an operable waste gate, wherein the system control unit is adapted to control the speed or effect of said electric motor, or generator, in conjunction with said operable waste gate based on the plurality of output signals from said at least one sensor.

5. The supercharging system according to claim 1, wherein the at least one physical parameters from said at least one sensor comprises at least one of the following:

at least one of a first pressure and mass flow parameter representative of exhaust gases at a first sensor of the at least one sensor;

a first temperature parameter representative of exhaust gases at the first sensor;

a first gas composition parameter representative of exhaust gases at the first sensor;

at least one of a second pressure and mass flow parameter representative of exhaust gases at a second sensor of the at least one sensor, upon the at least one sensor including the first and the second sensor;

a second temperature parameter representative of exhaust gases at the second sensor;

a second gas composition parameter representative of exhaust gases at the second sensor;

at least one of a third pressure and mass flow parameter representative of exhaust gases in said exhaust gas catalyzer;

a third temperature parameter representative of exhaust gases in said exhaust gas catalyzer; and a third gas composition parameter representative of exhaust gases in said exhaust gas catalyzer.

6. The supercharging system according to claim 1, wherein said at least one physical parameter includes at least one of pressure and mass flow, and wherein the turbine of the charging device with the electric motor or generator is configured to be driven until a respective one of said plurality of output signals reaches at least one of a reference value and range.

7. The supercharging system according to claim 1, wherein said at least one physical parameter includes at least one of pressure and mass flow, and wherein the turbine of the charging device with the electric motor or generator is configured to be driven while a respective one of said plurality of output signals maintains at least one of a reference value and range.

8. A method for operating a supercharging system for an internal combustion engine including an exhaust gas propelled turbo supercharging system, a mechanical supercharging system, and an electrical supercharging/regenerating system, the exhaust gas propelled turbo supercharging system including a charging device, the charging device including a turbine and a compressor, the compressor being arranged on a compressor shaft;

the exhaust gas propelled turbo supercharging system coupling the turbine to at least one exhaust outlet of the internal combustion engine, the electrical supercharging/regenerating system coupling an electric motor or generator, to the compressor shaft via a planetary gear set, and the mechanical supercharging system coupling a crank shaft of the engine to the electric motor or generator via a clutch, the method comprising:

measuring at least one physical parameter of exhaust gases at least one of inside and after having passed an exhaust gas catalyzer of the internal combustion engine, providing a plurality of output signals, of the plurality of output signals, each representing a respective one of a plurality of measured values of said at least one physical parameter, and controlling, by increasing or decreasing, speed of said electric motor or generator, based on each respective one of the plurality of output signals.

9. The method according to claim 8, wherein said at least one physical parameter includes at least one of pressure and mass flow, the method further comprising driving the turbine of the charging device with the electric motor or generator until a respective one of said plurality of output signals reaches at least one of a reference value and range.

10. The method according to claim 8, wherein said at least one physical parameter includes at least one of pressure and mass flow, the method further comprising driving the turbine of the charging device with the electric motor or generator while a respective one of said plurality of output signals maintains at least one of a reference value and range.

11. The method according to claim 8, wherein said at least one physical parameter includes temperature, the method further comprising driving the turbine of the charging device with the electric motor or generator until a respective one of said plurality of output signals reaches at least one of a reference value and range.

12. The method according to claim 8, wherein said at least one physical parameter includes temperature, the method further comprising driving the turbine of the charging device with the electric motor or generator while a respective one of said plurality of output signals maintains at least one of a reference value and range.

13. The method according to claim 8, wherein said at least one physical parameter includes exhaust gas composition, the method further comprising driving the turbine of the charging device with the electric motor or generator until a respective one of said plurality of output signals reaches at least one of a reference value and range.

14. The method according to claim 8, wherein said at least one physical parameter includes exhaust gas composition, the method further comprising driving the turbine of the charging device with the electric motor or generator while a respective one of said plurality of output signals maintains at least one of a reference value and range.

15. The method according to claim 8, further comprising, at start of said internal combustion engine, driving the turbine of the charging device with the electric motor or generator, for increasing the exhaust gas pressure and temperature, thereby reducing "light-off" time.

16. The method according to claim 8, wherein said at least one physical parameter includes emission levels, the method further comprising driving the turbine of the charging device with the electric motor or generator during an exhaust gas catalyzer regeneration process.

17. The method according to claim 8, the supercharging system further comprising at least one of an internal combustion engine throttle, variable vanes, an air by-pass valve, a waste gate and an engine control unit, and the method further comprising controlling at least one of the throttle, variable vanes, air by-pass valve, waste gate and variables in the engine control unit for counteracting pressure built by the compressor when the turbine is driven.

* * * * *